United States Patent [19]

Bazlen et al.

[11] 4,400,776
[45] Aug. 23, 1983

[54] DATA PROCESSOR CONTROL SUBSYSTEM

[75] Inventors: Dieter Bazlen, Stuttgart; Dietrich W. Bock, Schoenaich; Klaus J. Getzlaff, Boeblingen; Johann Hajdu, Boeblingen; Helmut Painke, Boeblingen, all of Fed. Rep. of Germany

[73] Assignee: International Business Machines Corporation, Armonk, N.Y.

[21] Appl. No.: 186,883

[22] Filed: Sep. 12, 1980

[30] Foreign Application Priority Data

Sep. 12, 1979 [DE] Fed. Rep. of Germany ....... 2936801

[51] Int. Cl.³ ............................................. G06F 9/00
[52] U.S. Cl. .................................................. 364/200
[58] Field of Search ............................ 364/200, 900

[56] References Cited

U.S. PATENT DOCUMENTS

| 3,426,328 | 2/1969 | Gunderson et al. | 364/200 |
| 3,611,307 | 10/1971 | Podvin | 364/200 |
| 3,614,745 | 10/1971 | Podvin | 364/200 |
| 3,962,683 | 6/1976 | Brown et al. | 364/200 |
| 4,040,021 | 8/1977 | Birchall et al. | 364/200 |
| 4,047,245 | 9/1977 | Knipper | 364/200 |

OTHER PUBLICATIONS

Albers, Variable Radix Shift Counter, IBM Technical Disclosure Bulletin, vol. 19, No. 11, Apr. 1977, pp. 4201–4202.
Barton et al, Clock Pulse Stretching Technique, IBM Technical Disclosure Bulletin, vol. 21, No. 8, Jan. 1979, pp. 3218–3219.
Spengler, Clock Circuit, IBM Technical Disclosure Bulletin, vol. 18, No. 3, Aug. 1975, pp. 867–868.

Primary Examiner—Mark E. Nusbaum
Assistant Examiner—Michael R. Fleming
Attorney, Agent, or Firm—Gregory A. Conley; E. W. Galbi; J. Jancin, Jr.

[57] ABSTRACT

An improved data processor control subsystem in which a cycle counter having a plurality of cascade-connected stages also comprises one or more supplemental or dummy stages, which can be selectively inserted or removed from the chain of cascade-connected stages, to alter the number of sub-cycles in an operating cycle, thereby decreasing the complexity of associated decoding circuitry.

5 Claims, 9 Drawing Figures

DATA PROCESSOR CONTROL SUBSYSTEM

BACKGROUND OF THE INVENTION

1. Field of the Invention

This invention relates to the field of data processor control subsystems, and more particularly, to a data processor control subsystem having an improved arrangement for an instruction cycle counter, in which one or more additional cycles may be introduced into otherwise identical sequences, by utilizing one or more "dummy" stages in the counter.

2. Description of the Prior Art

Known data processor control subsystems utilize cycle counters having a fixed number of stages, which in turn produce a fixed number of control cycles, determined by the maximum number of cycles required for the system operation. Where the number of cycles required is less than the maximum, the shortened operation is realized by additional combinational logic circuits for decoding a shorter operating cycle. The extra circuitry increases the complexity and the cost of this portion of the system.

OBJECTS AND SUMMARY OF THE INVENTION

Accordingly, it is a principal object of this invention to provide an improved data processor control subsystem which can provide varying numbers of cycles for a predetermined sequence.

Another object of the invention is to provide an improved subsystem of the type described, which includes decoding circuitry of less complexity and expense than previous systems.

The foregoing and other objects and advantages of this invention are attained by providing, in a cycle counter comprising a plurality of cascade-connected stages, one or more intermediate or "dummy" stages which are selectively inserted or removed from the normal sequence of stages, as required.

DESCRIPTION OF THE DRAWINGS

In the drawings.

Similar reference characters refer to similar parts in each of the several views.

DESCRIPTION OF THE PREFERRED EMBODIMENTS

Control devices in electronic data processing systems controlling the execution of instructions with respect to their associated data generally distinguish the instructions of an instruction set that can be executed by the electronic data processing system by means of the different operation codes uniquely characterizing an instruction.

In horizontal programming (microprogramming) other bits or bit fields in the instruction format can also be used mostly for direct control, i.e. without decoding, of the operation in the execution of an instruction.

In the microinstruction set of a machine there is quite a number of microinstructions which are basically equal and differ only in the length of the data path along which the data of an instruction are transferred. There exists e.g. a number of FETCH instructions, i.e. instructions by means of which data are fetched from a storage and transferred to another system component for processing. On their way to the other system component, e.g. a register or a local store the data can, if necessary, also be directed via another system component for intermediate processing, and subsequently transferred to their destination, the register or local store.

When data are transferred from the main store into the local store along a longer data path leading e.g. via a decimal function executing a conversion of unpacked decimal numbers into packed decimal numbers, this intermediate processing necessitates an additional cycle. However, if the data transferred from the main store into the local store are binary data which do not require such an intermediate processing as the decimal data the data required for this instruction are propagated directly on a shorter data path from the source to the destination. This is the only difference of the two microinstructions with respect to their design.

Figure 4:
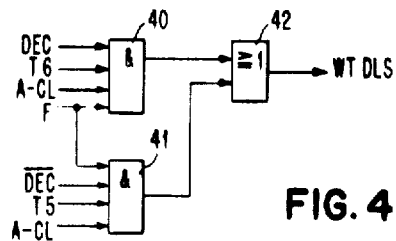

Structurally, this difference in the machine has the consequence that as shown in FIG. 4, the generation of the write pulse WT DLS for the local store, to give an example, controlling the moment of storing the data or address information into the local store is possible only with more than twice the amount of circuitry. This is due to the fact that apart from the AND gate 41 controlling the moment of writing, in the selected example-cycle time T5, for the data transferred on the shorter data path, there is also to be an AND gate 40 controlling the moment of writing one cycle time later, i.e. T6 for the decimal data transferred on the longer path, both outputs having also to be propagated via an OR gate 42.

This type of operation control requires improvement for cost and reliability reasons, particularly for data processing systems of the small to medium size.

Known circuit arrangements which are necessary for the adaptation of the propagation time with respect to data and clock signals because these signals are transferred via lines of different length, do not contribute to a solution of this problem as they are continuously effective and as they can not distinguish between such cases which require one propagation time adaptation through an additional delay unit and those cases where this is not required.

Figure 1:
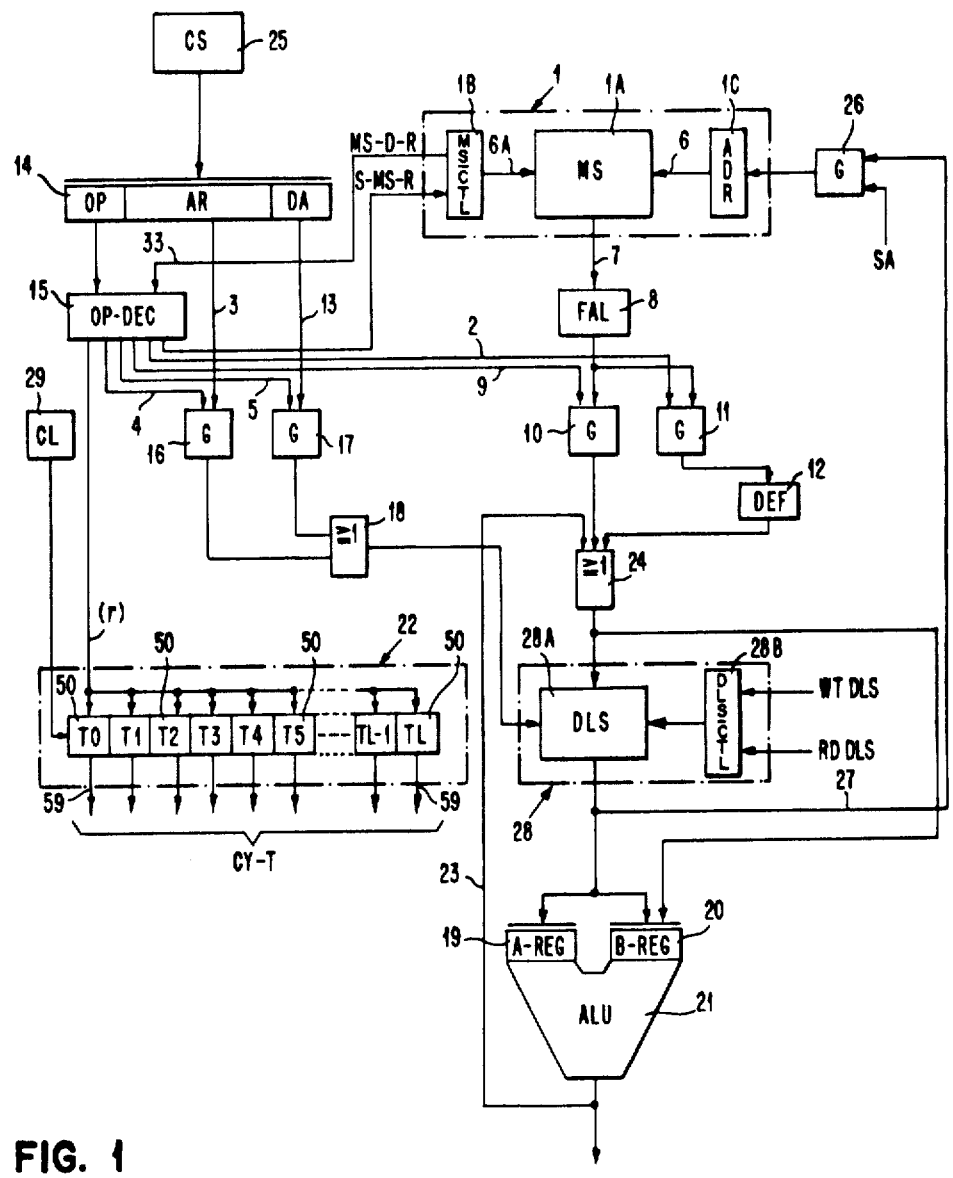
FIG. 1 is a schematic block diagram of an electronic data processor.

Referring now to the drawings, FIG. 1 shows a section of the control unit of an electronic digital computer, as well as essential connecting elements between the control unit and main store 1 of the system.

Macroinstructions, i.e. instructions of the user program are executed by dividing them into a sequence of microinstructions which are resident in the control storage (CS) 25.

The microinstructions of a sequence are read successively into an instruction register 14 which in the present case shows three fields, one for the operation code OP and two, AR and DA, for addresses for the local storage 28.

The address in field AR can be the address of a first, and address DA can be that of a second operand. The latter can also be at the same time that address to which the result of the combination of the two operands of a microinstruction can be written into the local store. The addresses are applied to local store 28 via lines 3 to 13, respectively and gates 16 or 17, and 18, respectively. Gates 16 and 17 are governed by the control signals of the operation decoder which the decoder generates after the decoding of operation code OP, and via lines 4 and 5, and they are also controlled by clock signals not shown in this figure. These clock signals ensure that e.g. first the address of the first operand and then the address of the second operand are transferred to local store 28. Then, the two operands are read out successively, first the A-operand into the A-register (A-REG) 19, and then the B-operand into the B-register (B-REG) 20 of local store 28. From there, the two operands reach the arithetic and logic unit (ALU) 21 where they are combined in accordance with an arithmetic or logic function. Via output line 23, the result of the combination again reaches local store 28 via an OR-gate 24, i.e. the storage location characterized by the address of the B-operand.

The writing and reading of information into and out of local store 28 is performed, as shown in FIG. 1, by means of a local store control logic (DLS-CTL) 28b controlled by control signals RD DLS for reading, and WT DLS for writing.

Local store 28 also contains addresses referring to the main store. These addresses are transferred via line 27 and gate 26 to the address register (ADR) 1C of main store 1. This main store consists of the storage array (MS) 1A, the above mentioned address register 1C, as well as main store control logic (MS-CTL) 1B to which detailed reference will be made below.

Via a storage data output bus 7, the data read out of main store 1 reach a circuit arrangement (FAL) 8 where a respective byte structurization or formatting of the data takes place which are read out of main store 1 unstructured with respect to their word or half-word limits.

From the circuit arrangement 8 for structurizing, the data reach two gates 10 and 11 controlled via control lines 9 and 2 by output signals of operation decoder 15. If there is a control signal on line 9 for enabling gate 10, the data reach local storage 28 via OR gate 24. If, however, there is a control signal on line 2 which enables gate 11 the data reach the local store only over a circuit arrangement 12 which e.g. executes a decimal function (DEF) for these data.

Figure 7:
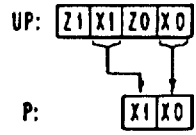
FIG. 7 is a schematic representation of decimal numbers in unpacked and packed form.

The decimal function to be performed by circuit arrangement 12 can e.g. be the decimal packing of unpacked data. Reference is made to FIG. 7 schematically explaining this decimal function. This figure shows in the top row the unpacked form UP of two numbers X0, Z0 and X1, Z1, two bytes being required for this representation. The first half of a byte is used for the numeric part X, and the second half for the zone part Z.

In the conversion into the packed form P shown in the bottom row of FIG. 7 the two numbers are compressed into one byte, in such a manner that the first half receives the number X0 and the second half the number X1 of the two numbers.

After this data compression in circuit arrangement 12, the data are also transferred via OR gate 24 into local store 28. The conversion from the unpacked into the packed form requires a very short time only, i.e. less than one cycle time T.

The above given example of an instruction by means of which data are to be transferred from main store 1 to local store 28 either in unpacked or in packed form shows that for otherwise identical processes both types of microinstructions differ only in that one cycle time in which the data are transformed from an unpacked into a packed form.

So there is the problem that during the execution of microinstructions controlled by an instruction cycle counter 22 it may be necessary to insert an additional instruction cycle Ti for otherwise identical processes. Such an additional cycle is e.g. necessary when the data fetched from main store 1 are to be transferred via a longer path to their destination, e.g. local store 28.

As already shown in FIG. 1, the total amount of cycle times CY-T of a microinstruction are generated by a cycle counter designed as a one out of n-code shift register. When cycling through the individual stages 50 this cycle counter generates the control signals corresponding to the cycle times T0 to TL (see FIG. 3). Each cycle time Ti contains two pulses, i.e. a pulse of the A-clock A-CL and a pulse of the B-clock B-CL (see lines 1 to 3 in FIG. 2) not overlapping therewith.

Figure 3:
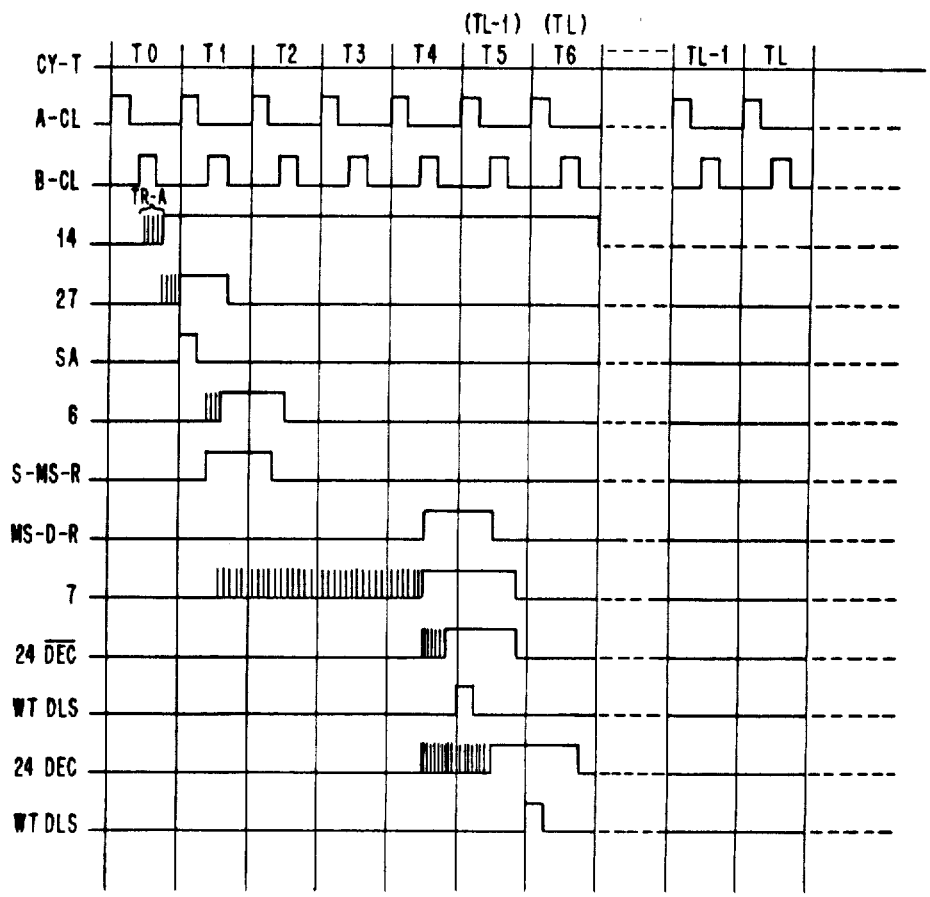
FIG. 3 is a schematic diagram illustrating waveforms found at particular locations in FIG. 1, FIGS. 4 and 6 are schematic illustrations of decoding circuits used with the cycle counters in the data processor.

As also shown in FIG. 3, the storing of the data from main store 1 into local store 28 can be effected at cycle time T5, with the generation of write signal WT DLS shown in the third row from the bottom in FIG. 3. The short path thus consists of cycle times T0, T1, T2, T3, T4 and T5.

With decimal function DEF being included, the storing of the data from main store 1 into local store 28 can be effected at cycle time T6 only, with the generation of write pulse WT DLS at the beginning of this cycle time, as shown by the last line in FIG. 3. The long path thus extends over cycle times T0, T1, T2, T3, T4, T5 and T6.

The selective insertion of an additional stage into the shift register chain consisting of flipflops and forming the cycle counter has the effect that for both microinstructions described above a numerically constant instruction cycle length is achieved so that the control signals controlling the data flow of the system can for both cases be generated in the same manner. As pointed out above this is the principal advantage of the invention.

Figure 5:
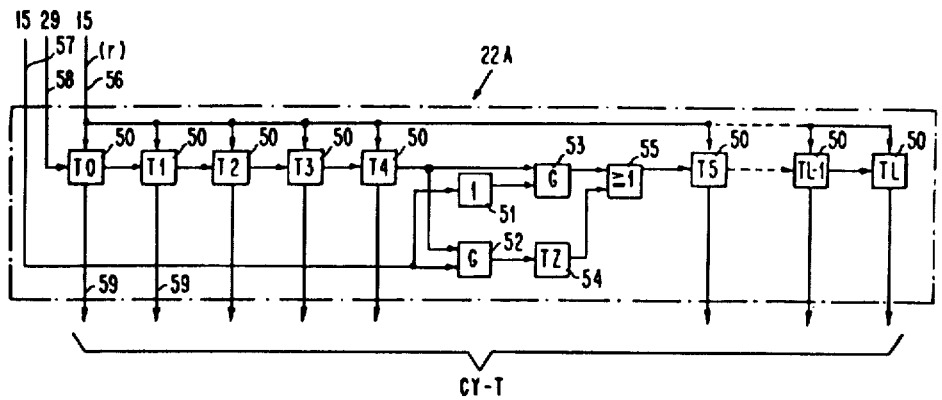
FIGS. 5, 8, and 9 are schematic block diagrams of instruction counters to be used in the system of FIG. 1, and embodying the present invention.

An instruction cycle counter suitable for generating the control signals for executing the microinstructions which are equal with the exception of their path length, is shown in FIG. 5. With such an instruction cycle counter 22a the operation decoder 15 can be of a less complicated structure since e.g. for the two microinstructions of the above type it merely has to generate always the same control signals for the data flow.

This counter is modified for the embodiment discussed in connection with FIG. 1. For other embodiments, similar modifications are easily possible, if required.

Instruction cycle counter 22a shown in FIG. 5 consists of a series of flipflops 50 of which only one respective flipflop is conductive at a time. The conductive flipflop generates an output signal that is associated to its instruction cycle time ti. Between the end of a preceding microinstruction and the beginning of a new one, instruction cycle counter 22a is reset by operation decoder 15 through a reset signal r via line 56. At the beginning of a new microinstruction that clock signal of clock generator 29 of FIG. 1 which via line 58 is transferred to the first stage 50 representative for cycle time T0, activates this stage. The second clock signal then deactivates this stage and activates the subsequent stage for determining cycle time T1. Each subsequent clock pulse deactivates the preceding stage and activates the subsequent one until finally the last clock pulse activates the last stage which generates cycle time TL and deactivates the preceding stage which generated the last but one cycle time TL-1. Instruction cycle counter 22a can provide instructions of variable length, i.e. when an instruction cycle requires six instruction cycles only, e.g. cycle times T0 to T5, it generates, controlled by the operation decoder, cycle times T0, T1, T2, T3, TL-1 and TL, which are described here in a general form.

The specific feature of instruction cycle counter 22a consists in that this counter which is e.g. designed for the simple control of a microinstruction which fetches data from the main store and transfers them to the local store, the conversion of the data from an unpacked into a packed form being possibly included in the control, also comprises an additional flipflop 54 activated upon request only, said flipflop generating the additional cycle time TZ. Output lines 59 of the respective stages are connected to the various gates of the data flow where the various cycle times, combined with the output signals of operation decoder 15 perform the control actions in the execution of the respective microinstruction. The combination of the control signals, i.e. of the output signals of operation decoder 15 with the respective cycle times is not shown in detail in FIG. 1 but can be concluded from FIG. 3.

The instructions characterizing a shorter or a longer transfer path of the data from source to destination differ either in the operation code or, with the operation code being the same, they differ in a control bit in the horizontal instruction format. However this differentiation, it is represented by a signal on a control line 57 passing either from operation decoder 15 or from instruction register 14 to instruction cycle counter 22a.

The absence of such a control signal on line 57 characterizes an instruction whose data are transferred on a shorter path. Such an instruction could e.g. be: "Fetch binary data from main store and transfer them to local store." In such an instruction, the data do not pass via circuit arrangement 12 in FIG. 1 for the decimal function. The data propagation path is thus shorter by one cycle time. The lack of one control signal on line 57 prevents the enabling of gate 52 so that it can not insert the additional element 54 into the chain of flipflops between the flipflop for cycle time T4 and the flip-flop for cycle time T5. Rather, gate 53 is enabled via inverter 51 so that the activation signal from the flipflop for cycle time T4 reaches the flipflop for cycle time T5 via gate 53 and OR gate 55.

Microinstructions whose data cover a longer path from source to origin, as e.g. in an instruction which could be: "Fetch decimal data, convert them into the packed form and transfer them to local store" generate a control signal on line 57, so that now with an enabled gate 52 the additional flipflop 54 can be inserted via OR gate 55 into the flipflop chain between the flip-flop for cycle time T4 and the flipflop for cycle time T5. The direct path of the activation signal is blocked via inverter 51 and the not enabled gate 53. In this manner, the additional cycle time required for converting the decimal data into a packed form is generated for the data propagation on the longer path.

The procedures in the execution of the above microinstructions "Fetch binary data from main store and transfer them to local store," and "Fetch decimal data from main store, convert them into packed form and transfer them into local store" which have been described above in a general manner, will now be described once more in detail.

Figure 2:
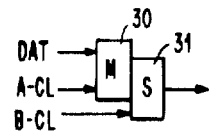
FIG. 2 is a schematic illustration of a bistable circuit known as a "master-slave flip flop."

It should be pointed out first that the stages and flipflops forming the registers in FIG. 1 are structured in accordance with the master-slave principle represented in FIG. 2. These master-slave flipflops consist of a first flipflop 30 forming the master part (M), and of a second flipflop 31 forming the slave part (S). The first flipflop 30 comprises two inputs, the data being applied to the one, and the A-clock A-CL being applied to the other. The second flipflop 31 has two inputs, too, the one being connected to the output of the first flipflop 30 and the second to the b-clock B-CL. The output of the second flipflop 31 is the external output of the master-slave flipflop. The information stored in the first flipflop 30 of a master-slave flipflop reaches with a pulse of the B-clock B-CL the output of the master-slave flipflop.

As shown in FIG. 3, the pulse of the B-clock starts at cycle time T0 at the output of instruction register 14 a signal transition activity marked TR-A and leading prior to the expiration of cycle time T0 to stable signals, as shown by the fourth row from the top in FIG. 3. In the remaining cycle time T0, local store 28 is read out and the read out information, a main store address, is supplied on line 27. At the beginning of cycle time T1, the signal on line 27 is already stabilized. Thus, gate control pulse SA synchronized with a pulse of the A-clock can be used for enabling gate 26 so that the address is transferred from this gate into address register 1C. After a predermined signal transition activity therefore the main store address is available from the middle of cycle time T1 onward at output 6 of address register 1C (see the 7th line in FIG. 3).

From operation decoder 15 a start signal S-MS-R for the execution of a read operation is transferred at the beginning of a B-clock pulse to the main store control logic 1B via line 32 at cycle time T1. Approximately at the end of the pulse of the B-clock at cycle time T4, the main store control logic 1B signals via a line 33 to operation decoder 15 that main store 1 can provide the data for the transfer via storage data output bus 7. This signal is marked MS-D-R and shown in FIG. 3 in the sixth row from the bottom.

FIG. 3 shows in the fifth row from the bottom how the data on storage output bus 7 are instable for approximately three cycle times as a consequence of the reading out of storage matrix 1A, but are re-stabilized from the middle of cycle time T4 approximately.

The data which are now to be considered good reach the two gates 10 and 11 via circuit arrangement 8 where they are structurized for machine handling. It depends on the microinstruction to be executed whether they are to be transferred into local store 28 along the shorter path through gate 10 and OR-gate 24, or on the longer path via gate 11, circuit arrangement 12 for executing a decimal function, and subseuently via OR-gate 24 into local store 28.

Let it first be assumed that binary, i.e. not decimal data are involved. These are transferred into local store 28 along the shorter path. Toward the end of cycle time T4, these data are available at the output of OR gate 24 for writing into local store 28, as shown by the fourth row from the bottom in FIG. 3. Synchronously with a pulse of the A-clock at cycle time T5, write control signal WT DLS is generated and transferred to local store control logic 28b. With this write control pulse, the data are propagated from the output of OR gate 24 into storage array 28a of the local store. They are written in at a storage position which is e.g. determined by the address in the address field DA of the microinstruction in instruction register 14. This address is transferred via a gate 17 that is controlled by an output signal of operation decoder 15 via line 5, in combination with a time control signal not shown and associated to a predetermined cycle time Ti, and via OR gate 18 to storage array 28a of the local store.

If the instruction to be executed is to transfer data along the longer path the decimal data appearing in a structurized manner at the output of circuit arrangement 8 and existing in an unpacked form are transferred via gate 11 to circuit arrangement 12 which converts the decimal data from their unpacked into their packed form. Owing to this additional processing stage they are available at the output of OR gate 24 only one cycle time later, i.e. from the middle of cycle time T5, as indicated in the last but one row in FIG. 3. The write control signal WT DLS for the local store is therefore to be generated only one cycle time later, i.e. at cycle time T6. This is shown in the last row of FIG. 3.

If an instruction cycle counter is used, in which, as a function of the microinstruction, an additional stage can be inserted, this offers the advantage that on the part of operation decoder 15 generating the control signals combined with the cycle times for controlling the data flow the processing of two microinstructions of different lengths does not require any specific preparation. As shown by the above discussed embodiment there are only differences regarding the time for generating the write control signal WT DLS for local store 28.

These differences of time for the generation of the write control signal WT DLS for local store 28 can also be achieved through instruction cycle counters of different structure, e.g. an instruction cycle counter designed as a pulse counter, where, for the adaption to the longer data propagation along the longer data path, the regular counting pulse to that stage is suppressed which generates cycle time T5. This stage is to be activated only with the next pulse of the counting clock.

Figure 8:
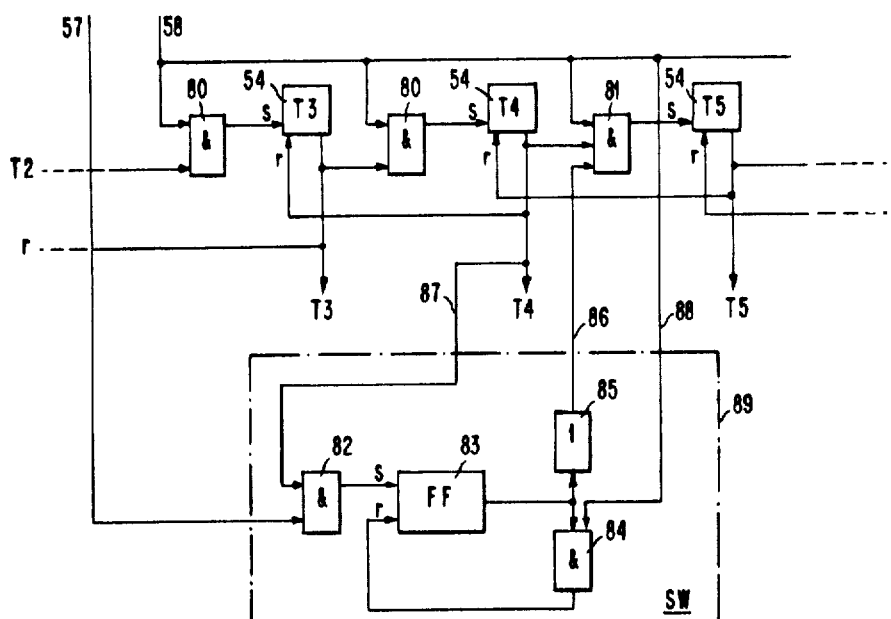

FIG. 8 shows the part of the instruction cycle counter where between the stages for cycle times T4 and T5 a suppressing circuit for the counting clock pulse is inserted.

The alternative embodiment of an instruction cycle counter also consists of flipflops 54 generating cycle times Ti. Each stage, e.g. the stage for generating cycle time T3 is controlled by the output signal of a preceding AND gate 80. This signal appears when via line 58 there appears a pulse of the counting clock simultaneously with the output signal of the preceding flipflop generating the signal corresponding to cycle time T2.

For suppressing a pulse of the counter clock for the duration of one period an electronic switch (SW) 89 is provided. This switch consists of a flipflop 83 whose setting input is preceded by an AND gate 82 which supplies a setting signal for flipflop 83 when there appears at the same time a control signal from the control unit of the data processing system on line 57, as well as the time control signal corresponding to cycle time T4. The output signal of the thus set flipflop 83 is inverted in an inverted 85 and transferred via line 86 to an AND gate 81 with three inputs. The inverted output signal of flipflop 83 thus inhibits AND gate 81 so that the signals applied at its other two inputs, i.e. the clock signal and the time control signal corresponding to cycle time T4 are suppressed. In this manner, flipflop 54 generating cycle time T5 can not be set. Consequently there is no resetting, either, of the flipflop associated to cycle time T4 via the connection of the output line of the flipflop associated to cycle time T5 to reset input r of the flipflop corresponding to cycle time T4. The output signal on line 87 thus remains effective at the input of AND gate 82. However, as the output signal of set flipflop 83 together with the next clock pulse arriving on line 58 resets again flipflop 83 via AND gate 84 and reset input r, AND gate 81 is enabled by the inverted output signal of reset flipflop 83 so that the majority of the clock pulse, still during the output signal of the flipflop associated to cycle time T4, reaches setting input s of the flipflop associated to cycle time 5, and sets this flopflop. The output signal of this flipflop now resets via reset input r the preceding flipflop associated to cycle time T4.

In this manner, the instruction cycle counter is stopped on cycle time T4 for two cycle times. This time suffices for transferring the data along the longer path so that in time with cycle time T5 write control pulse WL DLS for local store 28 can be generated.

Figure 9:
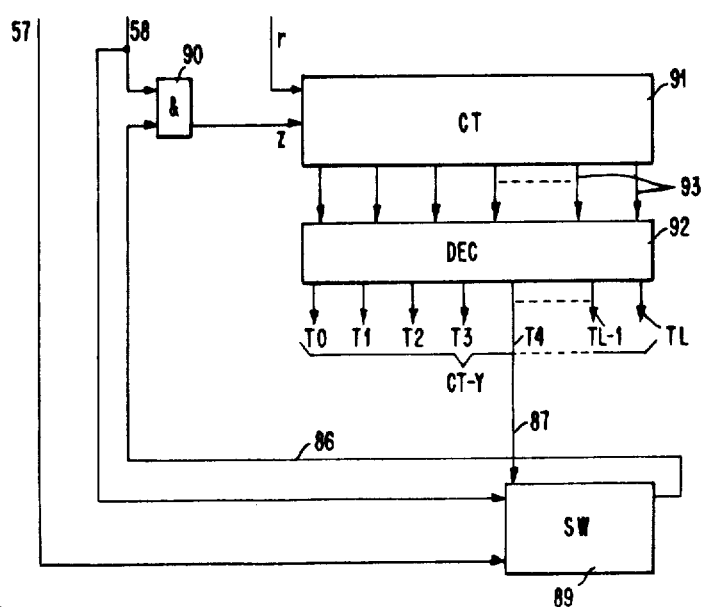

FIG. 9 shows how to use switch 89 for count pulse suppression also in an instruction cycle counter consisting of a genuine pulse counter (CT) 91 and a decoder (DEC) 92 decoding the position of the counter realized by the variety of possible combinations of the output signals on output lines 93, into the individual cycle times T0 to TL.

In this embodiment, switch 89 is connected to the instruction cycle counter as in the embodiment of FIG. 8. Here, output line 86 supplying the suppression signal is merely applied to an input AND gate 90 applying the pulses of the counter clock via line 58 to the counter input z of counter 91. If as in the embodiment discussed above the counter is to be stopped at cycle time T4 for two cycle times, the next count pulse on line 58, when counter 91 has reached the position of time corresponding to cycle time T4, is prevented by inhibited AND gate 90 from reaching input z of counter 91.

As the switch is reset in the manner described in connection with FIG. 8 the next but one pulse of the counter clock can stop counter 91 by one, so that the latter can generate cycle time T5 at the respective time.

Figure 6:
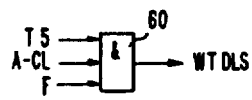

The efficiency of the new instruction cycle counters is demonstrated by a comparison of the two FIGS. 4 and 6. FIG. 4 shows that part of the instruction execution control which in a conventional manner generates write control signals WT DLS. Two AND gates 40 and 41 and an OR gate 42 are provided for that purpose. For executing the microinstruction "Fetch binary data from main store and transfer them to local store" control signal F is required which operates microinstructions generally fetching data from the main store and transferring them to the local store. Furthermore, signal DEC is required indicating that binary data are involved which do not have to be preocessed by a decimal function DEF, as well as a signal associated to cycle time T5, and finally a pulse of the A-clock. When these four input signals of AND gate 41 are applied simultaneously, this gate is conductive and generates via OR gate 42 write control signal WT DLS for the local store.

However, if there is a microinstruction "Fetch decimal data from main store, convert them into their packed form and transfer them to the local store," function signal F is required, as well as a signal DEC indicating that a decimal function DEF is to be performed, as well as a signal associated to cycle time T6, and a clock pulse of the A-clock A-CL. If these four input signals at AND gate 40 coincide, this gate is conductive and generates via OR gate 42 write control signal WT DLS for the local store.

If the new instruction cycle counters are used, however, only one AND gate 60 is required for generating write control signal WT DLS, which gate requires three input signals only: signal F characterizing both above mentioned mcroinstructions, a signal that is associated to cycle time T5, and finally a pulse of A-clock A-CL. If these four input signals at AND gate 40 coincide, this gate is conductive and generates via OR gate 42 write control signal WE DLS for the local store.

If the new instruction cycle counters are used, however, only one AND gate 60 is required for generating write control signal WT DLS, which gate requires three input signals only: signal F characterizing both above mentioned microinstructions, a signal that is associated to cycle time T5, and finally a pulse of A-clock A-CL. The coincidence of these three signals renders AND gate 60 conductive so that the above mentioned write control signal is generated.

The embodiments described herein can also be applied systematically to other substantially similar microinstructions. In this manner, the control part of an electronic data processing system is simplified, with the consequence of reduced costs, particularly for data processing systems of the lower efficiency range, and increased reliability.

While the invention has been particularly shown and described with reference to preferred embodiments thereof, it will be understood by those skilled in the art that the foregoing and other changes in form and details may be made therein without departing from the spirit and scope of the invention.

We claim:

1. A data control subsystem for executing instructions comprising:
   a main memory;
   a local store coupled to said main memory by way of a long path and a short path;
   an instruction decoder for generating control signals from an instructions;
   an instruction cycle counter means coupled to said instruction decoder, said instruction cycle counter means further comprising:
      a counter for generating a chain of time control signals that correspond to an instruction to be executed;
      an insertion means coupled to said counter and actuated by at least one of said control signals for inserting at least one additional time control signal for an instruction routing data from said main memory to said local store by way of said long path; said at least one additional time control signal being inserted in said chain of time control signals to accommodate the longer propagation time associated with said long path; and
      a bypass means coupled to said counter and said insertion means for bypassing said insertion means when an instruction to be executed is routing data from said main memory to said local store by way of said short path, said bypass means being actuated by at least one of said control signals;
   a clock generator coupled to said instruction cycle counter means for generating clock signals which activate and deactivate said instruction cycle counter means; and
   data flow control gates coupled to said main memory, said local store, and said instruction decoder for receiving at least one of said control signals and accordingly routing data between said main memory and said local store;
   whereby the complexity of said instruction decoder is decreased since said instruction decoder generates the same control signals for equal instructions routing data from said main memory to said local store by way of said long path as those instructions routing data from said main memory to said local store by way of said short path due to said insertion means and said bypass means.

2. A data control subsystem according to claim 1 wherein said counter comprises a a plurality of flip flops arranged as a shift register.

3. A data control subsystem for executing instructions comprising:
   a main memory;
   a local store coupled to said main memory by way of a long path and a short path;
   an instruction decoder for generating control signals from an instruction;
   an instruction cycle counter means coupled to said instruction decoder, said instruction cycle counter further comprising:
      a counter for generating a chain of time control signals that correspond to an instruction to be executed;
      a suppression means coupled to said instruction decoder and said counter for suppressing at least one of the time control signals in said chain of time control signals for an instruction routing data from said main memory to said local store by way of said long path to accommodate the longer propagation time associated with said long path, said suppression means being activated by at least one of said control signals and at least one of said signals in said chain of time control signals;
   a clock generator coupled to said instruction cycle counter means for generating clock signals which activate and deactivate said instruction cycle counter means, said clock signals and at least one of said control signals also serve to deactivate said suppression means; and
   data flow control gates coupled to said main memory, said local store, and said instruction decoder for receiving at least one of said control signals and accordingly routing data between said main memory and said local store
   whereby the complexity of said instruction decoder is decreased since said instruction decoder generates the same control signals for equal instructions routing data from said main memory to said local store by way of said long path as those instructions routing data from said main memory to said local store by way of said short path due to said suppression means.

4. A data control subsystem according to claim 3 wherein said counter comprises a plurality of flip flops and logic gates arranged as a shift register.

5. A data control subsystem according to caim 3 or 4 wherein said suppression means comprises at least one flip flop and a plurality of logic gates for setting and resetting said flip flop such that said counter is held on a cycle time for two cycle times.

* * * * *